(12) United States Patent
Abdel-Kader

(10) Patent No.: US 8,744,527 B2
(45) Date of Patent: Jun. 3, 2014

(54) APPARATUS, AND ASSOCIATED METHOD, FOR SELECTING TERMINATING COMMUNICATION NOTIFICATION HANDLING AT A COMMUNICATION DEVICE

(75) Inventor: Sherif Aly Abdel-Kader, Waterloo (CA)

(73) Assignee: BlackBerry Limited, Waterloo (CA)

( * ) Notice: Subject to any disclaimer, the term of this patent is extended or adjusted under 35 U.S.C. 154(b) by 28 days.

(21) Appl. No.: 13/013,980

(22) Filed: Jan. 26, 2011

(65) Prior Publication Data

US 2012/0190345 A1 Jul. 26, 2012

(51) Int. Cl.
*H04B 1/38* (2006.01)
(52) U.S. Cl.
USPC ............................................. 455/566
(58) Field of Classification Search
USPC ............................................. 455/456.4, 566
See application file for complete search history.

(56) References Cited

U.S. PATENT DOCUMENTS

| | | | |
|---|---|---|---|
| 2004/0037396 A1* | 2/2004 | Gray et al. | 379/67.1 |
| 2005/0243982 A1* | 11/2005 | Starbuck et al. | 379/88.23 |
| 2007/0099620 A1 | 5/2007 | Patterson et al. | |
| 2009/0003580 A1* | 1/2009 | Sharpe et al. | 379/211.02 |
| 2009/0304167 A1* | 12/2009 | Wright et al. | 379/142.05 |
| 2010/0246785 A1* | 9/2010 | Wang et al. | 379/88.23 |
| 2011/0034154 A1* | 2/2011 | Maxfield | 455/414.1 |

FOREIGN PATENT DOCUMENTS

WO 2009/021120 A2 2/2009

\* cited by examiner

*Primary Examiner* — Joel Ajayi

(57) ABSTRACT

An apparatus, and an associated method, for facilitating alert handling at a communication device provides for selection at the communication device of the manner by which terminating communications at the communication device are handled. A terminating communication is detected at a receive part of the communication device, and an indication of its reception is displayed. Together with the displayed indication of the terminating communication, an actuation key is provided to permit selection of alert handling of the terminating communication and subsequent terminating communications.

16 Claims, 3 Drawing Sheets

APPARATUS, AND ASSOCIATED METHOD, FOR SELECTING TERMINATING COMMUNICATION NOTIFICATION HANDLING AT A COMMUNICATION DEVICE

The present disclosure relates generally to selection of a manner by which to handle alerting of a communication, such as a terminating call, at a wireless, or other, communication device. More particularly, the present disclosure relates to an apparatus, and an associated method, by which to permit a user to select handling of calls, or other communications, terminating at the communication device.

A user of the communication device makes the selection when a pending, terminating communication is detected at the communication device. The selection is for not only the terminating communication that is pending but also pertains to subsequent terminating communications. Dynamic selection of the manner by which to handle terminating communications is thereby provided.

BACKGROUND

Cellular communication systems are used by many through which to communicate. Typically, wireless devices, referred to as mobile stations, are operated by users to send and to receive information pursuant to a communication service. Communications made by way of a cellular communication system advantageously obviate the need to maintain wire line connections to carry out the communications. As a radio connection, provided by way of a radio air interface, is utilized, communications are possible by way of a wireless device as long as the wireless device is positioned within coverage range of system infrastructure forming a network part of a cellular communication system. The networks of various cellular communication systems have been installed over significant portions of the populated area of the world.

While early-generation, cellular communication systems provided primarily for voice communication services and only limited data service, successor generation systems have provided for increasingly data-intensive, data communication services. Wireless devices operable in such successor-generation, cellular communication systems are generally constructed to provide for both voice communication services and data communication services. Communication services provided by way of a wireless device oftentimes include, in addition to the voice communication services, multimedia communication services, messaging services, such as e-mail messaging, instant messaging, and the like.

Wireless devices used in cellular and other analogous, communication systems are typically of dimensions permitting easy carriage by a user. And, users oftentimes carry the wireless devices. A user is able, thereby, to have a wireless device readily available to receive terminating communications and to initiate communications that are to be terminated elsewhere. Thereby, a user to whom a communication is directed, such as a call placed to the user, is not dependent upon the user being at a particular location but, rather, merely depends upon the user carrying the wireless device and being positioned within the coverage area of a cellular communication network. The user is thereby more readily more accessible to others who needs to make and receive communications.

As many may appreciate, however, there may be some situations in which the user of the wireless device may not be able to, or may not desire to, accept an incoming communication. The user is typically alerted to a terminating communication by the annunciation of a ringtone, or other alert, which is generated in human perceptible form. If the user elects not to accept the terminating communication, the user must take steps to stop the alert. Typically, a key or sequence of keys, is actuated by the user to elect not to accept the terminating communication. In a terminating voice call, election by the user not to accept the call typically routes the call to a voice mail service. And, while the user is also generally permitted to change alert operations at the device, such change requires more than insignificant attention on the part of the user. For example, in conventional practice, the user would be required to locate the appropriate user-interface input or screen at which the change options would be entered, which is sometimes available only subsequent to entry of a password. Multiple steps are typically required, therefore, to change the device alert options.

Wireless devices also typically provide a pre-set selection to not be alerted to terminating communications. Such selection is typically made by user entry of the selection by way of one or more keys of the wireless device.

Existing alert mechanisms and methods therefore are less than optimal. An improvement to the existing art would be beneficial.

It is in light of this background information related to communication devices that the significant improvements of the present disclosure have evolved.

DETAILED DESCRIPTION

Figure 1:
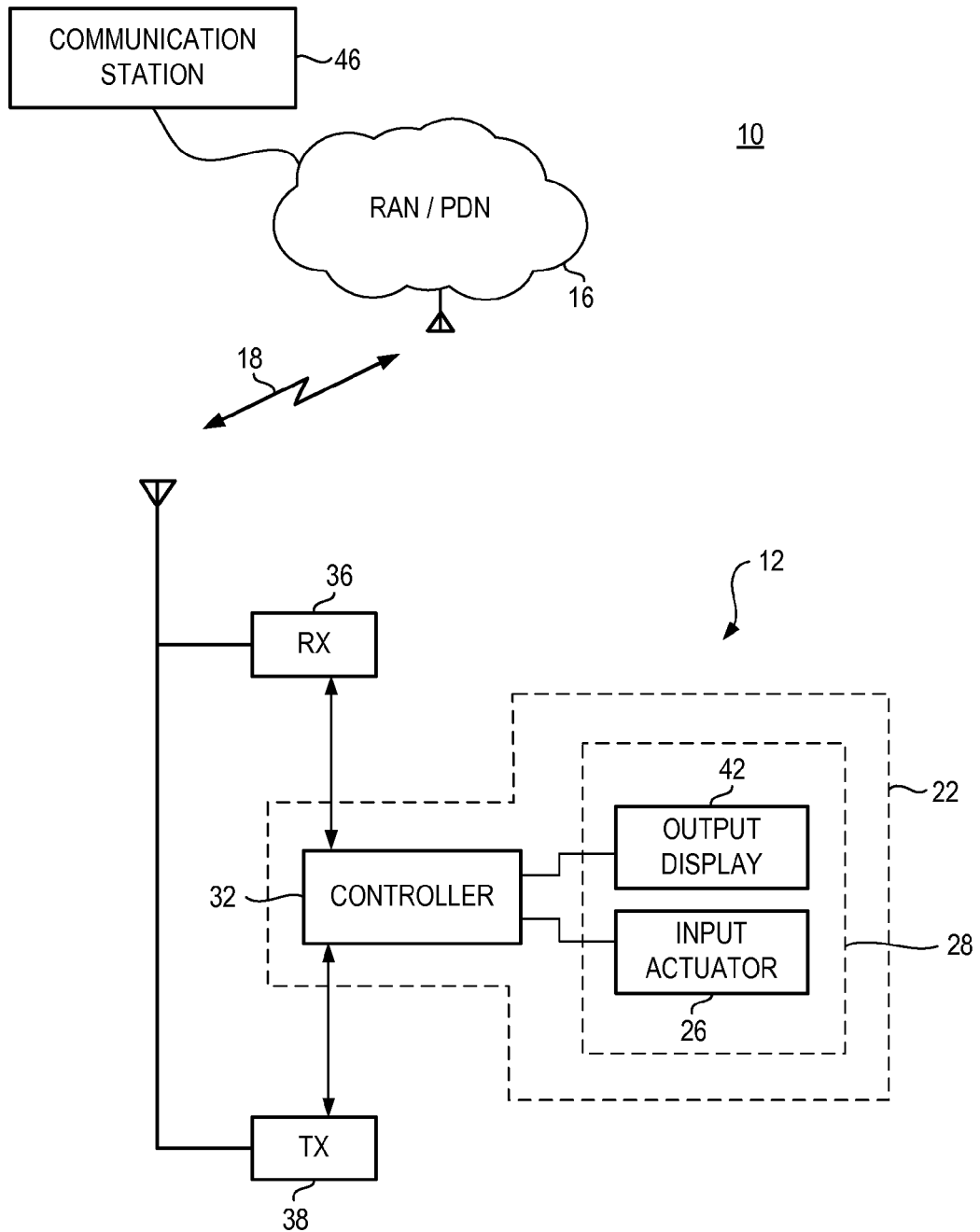
FIG. 1 illustrates a functional block diagram of a communication system in which an implementation of the present disclosure is operable.

The present disclosure, accordingly, advantageously provides an apparatus, and an associated method, by which to select a manner by which to handle alerting of a communication terminating at a wireless, or other, communication device.

Through operation of an implementation of the present disclosure, a manner is provided by which to permit a user to select handling of calls, or other communications, terminating at the communication device.

In one aspect of the present disclosure, a user of a wireless device makes the selection when the terminating communication is detected at the wireless device. The selection made by the user controls alert handling for not only the pending communication but also to subsequent terminating communications at the wireless device.

In another aspect of the present disclosure, an input actuator is provided to permit user actuation to select alert handling of terminating communications at the wireless device. The actuation of the actuator identifies the manner, if any, by which to annunciating a terminating communication. The selected manner, identified by way of detection of actuation of the input actuator, is the manner by which the pending communication termination is handled as well as that subsequently terminate at the wireless device.

In another aspect of the present disclosure, indication of the selected manner is used by a controller that forms a communication handling initiator that controls, and initiates, the alert handling of the wireless device. The controller controls the handling of the wireless device in conformity with the selected manner.

In another aspect of the present disclosure, the selected manner by which to handle the alerting of the terminating communication comprises an ignore feature. That is to say, when the selected manner comprises an ignore feature, the terminating communication is not alerted or is alerted in a manner in which a user of the wireless device is able easily to ignore the terminating communication.

In one implementation, the selected manner is sending, or calling, party specific. That is to say, a manner to ignore a terminating communication is selectable to select sending or calling parties whose terminating communications are to be ignored. And, a manner is further selectable to define the period during which the terminating communications of the identified sending or calling party are to be ignored.

In another aspect of the present disclosure, the selected manner by which to handle terminating communications is applicable to all terminating communications. That is, to say, the selected manner controls alerting of all terminating communications originated by all sending or calling parties. When all terminating communications are to be ignored, the user of the wireless device is not alerted to any terminating communication. In one implementation, the period during which the ignore feature is effective is further selectable.

In another aspect of the present disclosure, the selected manner by which to handle the terminating communications is time-dependent. That is to say, the selected manner by which to perform alert handling of terminating communications is limited to a selected time period. Subsequent to the termination of the selected time period, the handling of terminating communications reverts to a default, or prior-established, alert handling scheme. The time period is selectable in terms of, e.g., a selected number of minutes for which the selected manner shall be effective.

In another aspect of the present disclosure, the selected manner by which to perform the alert handling is effective for a selected period, defined in terms of an event. For instance, the event comprises an appointment period, such as an appointment that is identified in a calendar application installed at, or available to, the wireless device. The period during which the selected manner is effective is thereby not directly time-based but, rather, is dependent upon the duration period of an event.

In another aspect of the present disclosure, an input actuator is provided by which to facilitate change in the device alert options. Upon user selection of an ignore feature, the user is further provided with an option to change the alert handling of all subsequent communications. The user is provided, for instance, with an option to revert to default handling of subsequent communications, to select vibratory alert, to select silent alert, or to select a custom alert of subsequent terminating communications.

In another aspect of the present disclosure, the manner by which to perform the alert handling is selected in response to a terminating communication and, thereby, is made dynamically, and not in a wholly pre-arranged manner. In one implementation, a terminating communication is identified at a display screen of a user interface together with a selection indication to provide for selection of the selected manner by which to perform alert handling. The user of the wireless device is able to view an indication of the terminating communication and is able also to make selection of the subsequent alert handling of subsequent terminating communications. In one implementation, the selection is a multi-step selection in which multiple options are selected by the user to tailor the selected manner by which to handle alerting of subsequent terminating communications is effectuated. The selection, in one implementation, is made by way of an interactive display screen.

In these and other aspects, therefore, an apparatus, and an associated method, is provided to facilitate selection of handling of a communication terminating at a communication device. An input actuator is configured to provide for selection of a manner by which to handle the communication terminating at the communication device responsive to reception at the wireless device of an indication of the communication. The selected manner identifies the handling of the communication and subsequent communication handling of the communication device. And, a controller is configured to initiate communication handling of the communication device in conformity with the selected manner identified by actuation of the input actuator.

In these and other aspects, a mobile device, and an associated methodology, is provided. A selection detector is configured to detect selection of a manner by which to handle a terminating communication responsive to reception of an indication of the terminating communication. The selected manner identifies the handling of the terminating communication and subsequent communication handling. A communication handling initiator is operable responsive to detection by the selection detector of the selection. The communication handling initiator is configured to initiate communication handling in conformity with the selection.

Referring first to FIG. 1, a communication system, shown generally at 10, that provides for radio communications with wireless communication devices, of which the wireless device 12 is exemplary. Communications effectuated between a network part of the communication system, here represented by a radio access network/packet data network (RAN/PDN) 16, and the wireless device are made by way of radio channels defined upon a radio air interface, represented by the arrow 18. In the exemplary implementation, the communication system 10 comprises a cellular communication system. While the following description shall describe exemplary operation with respect to the exemplary implementation in which the communication system comprises a cellular communication system, more generally, the description is analogously also representative of operation of any of various other types of radio communication systems. Furthermore, while implementation is described with respect to a wireless communication system, operation in a wired communication system would be analogous. Therefore, the following description is also representative of implementation in a wired communication system with substitution of wired communication devices for structure illustrated in FIG. 1.

The wireless device 12 here comprises a portable mobile station of dimensions permitting its hand carriage by a user. Due to the portability of the wireless device, a user typically carries the device, such as in a pocket or purse of the user. The device is thereby available to the user to send and to receive information communicated pursuant to its operation. And, as mentioned previously, the wireless device provides an alert to a user when a call or other communication is terminated at the wireless device. The user may, however, be involved in an activity or otherwise not want to be interrupted with an alert to alert the user of terminating communications, particularly by communications originated by certain originating parties.

The wireless device 12 includes an apparatus 22 of an implementation of the present disclosure that facilitates alert handling of communications terminating at the wireless device. The apparatus 22 is functionally represented, implementable in any desired manner including, for instance, by hardware elements, software elements, algorithms executable by processing elements, and combinations thereof. Functions performed by the illustrated elements are carried out in any manner by any appropriate physical device or structure.

Here, the apparatus 22 shown to include an input actuator 26, which forms part of a user interface 28, and a controller 32. The elements together operate to detect selection of a manner by which to handle a terminating communication, and subsequent terminating communications, at the device 12. And the elements further are operable to cause initiation of communication handling in conformity with the selection.

The apparatus 22 is further connected to transceiver circuitry, represented by a receive (RX) part 36 and a transmit part 38. The user interface 28 is further shown to include an output display 42.

In one implementation, the user interface comprises an interactive screen display in which input actuation keys are displayable upon the interactive screen display and wherein actuation of the displayed keys is carried out by touching of appropriate locations of the display screen.

In exemplary operation, a call, or other communication, is originated at a communication station 46 for termination at the wireless device 12. Signals, such as call set-up signals, are sent by the network by way of the radio air interface 18, delivered to the wireless device and detected at the receive part 36 thereof. In a terminating call, identification information associated with the originating party is included in the setup information received at the receive part 36. Identifying information includes, for instance, the telephone number of the calling party. This information, as well as other information, such as information indexed at the mobile station together with the telephone number of the calling party, is displayed at the output display 42 of the user interface 28.

Together with the calling party information displayed at output display, the input actuator is made available to the user to select in what manner to handle alerting of at least subsequent terminating communications at the wireless device. And, the user is prompted to, or is otherwise permitted to, provide input by way of the input actuator 26 to input selection of the manner by which the wireless device is to handle alerts of subsequent communications terminating at the wireless device. Indications of actuation of the input actuator are provided to the controller 32. And, the controller controls subsequent alert handling at the wireless device in conformity with the input selections entered by way of actuation of the input actuator.

In one implementation, the user is provided with an option to ignore subsequent communications. That is to say, an ignore feature is available for selection by the user. When the ignore feature is selected, the wireless device does not generate an intrusive alert to alert the user of a terminating communication, such as a terminating call or data communication. The selection is further selectable to ignore communications of a particular calling, or other originating, party or to ignore all terminating communications. In the exemplary implementation in which the terminating communication is identified at the output display together with a prompt for the user to make selection with respect to alert handling, the user is provided with the opportunity to select whether to ignore subsequent communications from only the calling, or originating, party or whether to ignore subsequent terminating communications from all originating parties.

The user is further provided with the capability to select the duration of the period for which the ignore feature is in effect at the wireless device. The user is able to select, for instance, a time period during which the ignore feature is in effect. Or, the user is able to select an event-defined period during which the ignore feature is effective. If, for example, the wireless device also utilizes, or accesses, a calendar or appointment application, the user is permitted alternately to select the duration of the ignore feature to correspond to a calendared event or appointment.

Through selection of the ignore feature and its duration, the user of the wireless device dynamically controls the alert handling performed at the wireless device. And, because the periods during which the ignore feature is effective is period-constrained, the ignore feature is not permanently effective. A problem associated with failed alerts due to a user forgetting to change the alert handling of the wireless device is less likely to be a problem.

Figure 2:
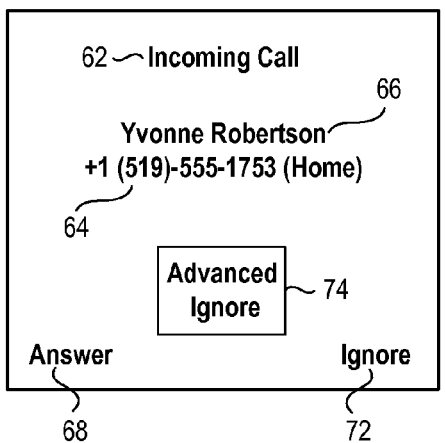
FIG. 2 illustrates an exemplary screen display generated pursuant to operation of an implementation of the present disclosure.

FIG. 2 illustrates an exemplary display 58 generated during operation of an implementation of the present disclosure. The display 58 is generated, e.g., at an interactive display screen. The display 58 is generated when the receive part 36 detects a terminating communication, here a terminating call, at the wireless device. The display identifies the incoming call with the text "incoming call" 62, the telephonic identity 64 of the originating party and, here also, the name 66 of the originating party. The interactive screen display at which the display 58 is displayed provides touch-screen keys 68 to answer the terminating call, to ignore the terminating call, and, also, an advanced ignore key 74. When the user actuates the key 68, the terminating call is accepted. If the user actuates the key 72, the terminating call is ignored. And, if the user actuates the key 74, the ignore feature is activated. Additionally, alert generation alerting the receipt of the terminating call, of other communication, is ended upon key 74 actuation.

Figure 3:
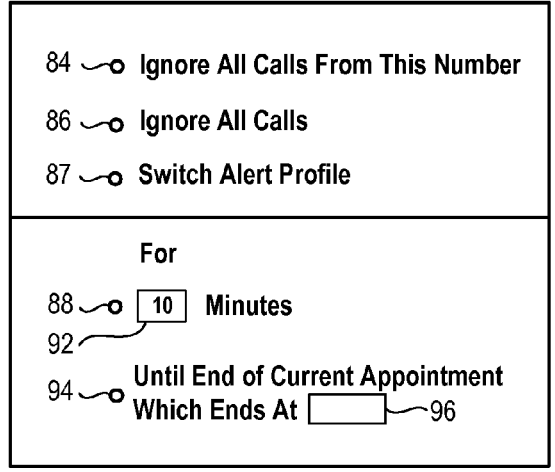
FIG. 3 illustrates another exemplary screen display, also generated pursuant to operation of an implementation of the present disclosure.

FIG. 3 illustrates a display 82, also displayable at an interactive display screen. The display 82 is displayed at the display screen upon selection of the advanced ignore actuation key 74, shown in FIG. 2. The display 82 provides the user of the wireless device options 84 and 86 to ignore subsequent terminating communications from a selected originating party, here the party that originated the call or all subsequent terminating communications at the wireless device. And, a device option 87, a switch alert profile, is further provided to permit a user to change all subsequent alert handling operation.

The display further provides for the selection of a time period during which the ignore feature is to be effective. Here, when the key 88 is selected, the number of minutes is further selectable. Ten minutes is inserted by the user in this exemplary display. The screen 82 further provides an actuation key 92 that provides for selection of the effective period of the ignore feature to correspond to the duration of an event, here a current appointment, such as identified in a calendar application for whose termination is entered by a user at the location 94.

Figure 4:
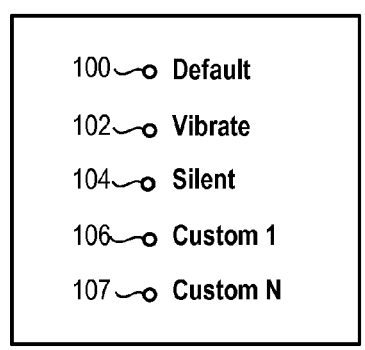
FIG. 4 illustrate another exemplary screen display, also generated pursuant to operation of an implementation of the present disclosure.

FIG. 4 illustrates a display 98, also displayable at an interactive display screen. The display 98 is displayed at the display screen upon selection of the switch alert profile 87, shown in FIG. 3. The display 98 provides the user of the wireless device options 100, 102, 104, 106, and 107 to switch all subsequent alert handling at the wireless device. Selection of option 100 causes alert handling to revert to a default selection. Selection of the option 102 causes subsequent alert handling to be in a vibratory mode. Selection of option 104 causes subsequent alert handling to be in a silent mode. And selection of options 106 and 17, respectively, cause reversion to custom modes.

Figure 5:
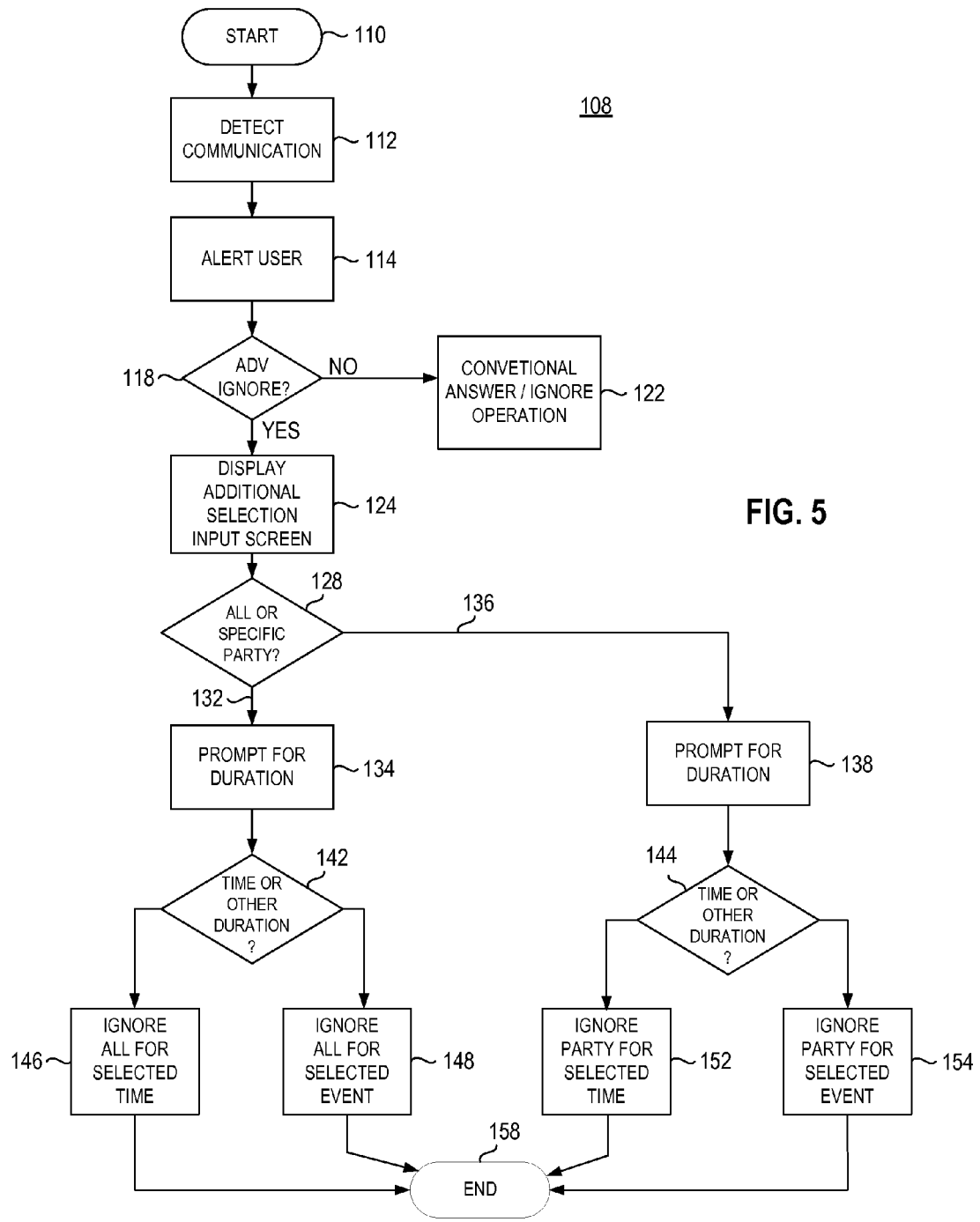
FIG. 5 illustrates a process diagram representative of the process of operation of an implementation of the present disclosure.

FIG. 5 illustrates a process, shown generally at 108, of operation of an implementation of the present disclosure. The process is described with respect to the wireless device 12 shown in FIG. 1. The process is, however, implementable in other wireless devices.

Subsequent to start, indicated by the start block 110, detection is made, indicated by the block 112, of a terminating communication. Responsive to the detection, and as indicated by the block 114, the terminating communication is displayed, or otherwise alerted, to a user.

Then, and as indicated by the decision block 118, a determination is made whether the advanced ignore feature is selected by a user of the wireless device. If not, the no branch is taken to block 122, and conventional answer or ignore operations are carried out at the wireless device. If, conversely, the advanced ignore feature is selected, the yes branch is taken to the block 124 and the user is prompted to select the manner in which the ignore feature is to be performed. Then, at the decision block 128, a determination is made as to whether terminating communications from all originating parties are to be ignored or if only communications originated by the party whose communication is detected at the function 112 are to be ignored. If all subsequent terminating communications are to be ignored, the branch 132 is taken to block 134. And, conversely, if only the subsequent terminating communications originated by a selected party or parties is to be ignored, the branch 136 is taken to the block 138.

At the blocks 134 and 138, respectively, the user of the wireless device is prompted to select the duration during which the ignore feature is to be effective. And, at the decision blocks 142 and 144, respectively, determinations are made as to whether a time-period duration or event-constrained duration is selected. And, responsive to the determination, branches are taken to a block 146, 148, 152, or 154 to implement the selected manner by which alert handling is to be carried out. Branches from the block 146-154 extend to the end block 158.

Figure 6:
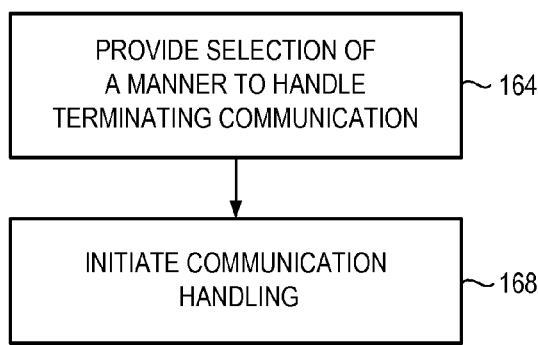
FIG. 6 illustrates a method flow diagram representative of the method of operation of an implementation of the present disclosure.

FIG. 6 illustrates a method flow diagram, shown generally at 162, representative of the method of operation of an implementation of the present disclosure. The method facilitates selection of handling of a communication terminating at a wireless device.

First, and as indicated by the block 164, selection of a manner by which to handle the communication terminating at the wireless device is provided. The selection is provided responsive to reception at the wireless device of an indication of the communication. The selected manner identifies the handling of the communication and subsequent handling of the wireless device. Then, and as indicated by the block 168, communication handling is initiated at the wireless device in conformity with the selected manner.

Thereby, a manner is provided by which to permit a user to make selection of the manner by which communication-termination alerts are handled at the wireless device. The selection is made dynamically and need not be prearranged. And, the duration for which the selection is effective is limited so that, even if the user forgets that the selection has been made, the selection is affective only for a constrained.

Presently implementations of the disclosure and many of its improvements and advantages have been described with a degree of particularity. The description is of examples of implementing the disclosure, and the description of examples is not necessarily intended to limit the scope of the disclosure. The scope of the disclosure is defined by the following claims.

What is claimed is:

1. An apparatus to facilitate selection of handling of terminating calls at a communication device, the apparatus comprising:
a user interface comprising an input actuator and a screen display, the input actuator configured to receive user selection of the handling of terminating calls responsive to detection of a terminating call at the communication device, the screen display configured to display a first display that identifies the terminating call and provides for user selection at the input actuator of a manner by which to ignore the terminating call, the screen display further configured to display, responsive to user selection of the manner by which to ignore the terminating call, a second display, the second display providing for user selection at the input actuator to ignore all terminating calls from a selected party or to ignore all terminating calls, and the second display providing for user selection of a time period during which to ignore the terminating calls or an event period during which to ignore the terminating calls, the event period defined by an appointment in a calendar application accessible to the communication device; and
a controller configured to initiate call handling of subsequent terminating calls at the communication device in conformity with user selection entered at the input actuator.

2. The apparatus of claim 1 wherein the input actuator of said user interface is further configured to include a first actuation key actuable to initiate the selection.

3. The apparatus of claim 2 wherein the first actuation key is configured to initiate selection to ignore the terminating calls at the communication device.

4. The apparatus of claim 3 wherein the input actuator is further configured to provide for identification of further definition of the selection to ignore the terminating calls at the communication device.

5. The apparatus of claim 4 wherein screen display is further configured to display a menu display having menu entries, each entry identifying a further definition of the selection to ignore calls terminating at the communication device.

6. The apparatus of claim 5 wherein a menu entry of the menu entries comprises further definition to ignore all subsequent calls terminating at the communication device.

7. The apparatus of claim 6 wherein the menu entry of the menu entries further comprises further definition to ignore all subsequent calls terminating at the communication device for the duration of the calendar appointment in the calendar application.

8. The apparatus of claim 5 wherein a menu entry of the menu entries comprises further definition to ignore all subsequent specific-sending-station calls terminating at the communication device.

9. The apparatus of claim 8 wherein the menu entry of the menu entries further comprises further definition to ignore all subsequent specific-sending-station calls terminating at the communication device for a selected period.

10. The apparatus of claim 6 wherein the menu entry of the menu entries further comprises further definition to ignore all subsequent specific-sending-station calls terminating at the communication device.

11. The apparatus of claim 8 wherein the subsequent specific-sending-station calls terminating at the communication device comprise subsequent specific-sending-station calls associated with the indication of the calls responsive to which the input actuator is configured to provide for the selection.

12. The apparatus of claim 5 wherein the screen display is further configured to display identification of calls terminating at the communication device.

13. A method for facilitating selection of handling of terminating calls at a communication device, the method comprising:

detecting a terminating call at the communication device;

providing for receipt of user selection of the handling of terminating calls responsive to detection during said detecting, user selection made at a user interface having an input actuator and a screen display, the screen display configured to display a first display that identifies the terminating call and provides for user selection at the input actuator of a manner by which to ignore the terminating call, the screen display further configured to display, responsive to user selection of the manner by which to ignore the terminating call, a second display, the second display providing for user selection at the input actuator to ignore all terminating calls from a selected party or to ignore all terminating calls, and the second display providing for user selection of a time period during which to ignore the terminating calls or an event period during which to ignore the terminating calls, the event period defined by an appointment in a calendar application accessible to the communication device; and initiating call handling of subsequent terminating calls at the communication device in conformity with the selected manner selected responsive to the providing for selection.

14. The method of claim 13 wherein the providing for receipt of user selection comprises displaying a selection key at a selection interface display.

15. The method of claim 14 wherein the displaying comprises displaying the selection key together with an indication of the terminating calls at the communication device.

16. The method of claim 13 wherein the providing for receipt of user selection further comprises ending alert generation responsive to the reception of the indication of the terminating calls.

\* \* \* \* \*